Patented Oct. 26, 1954

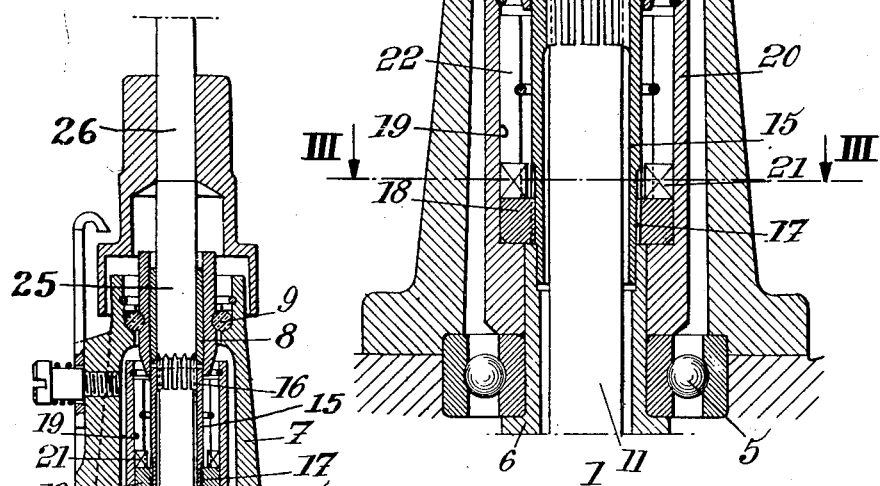
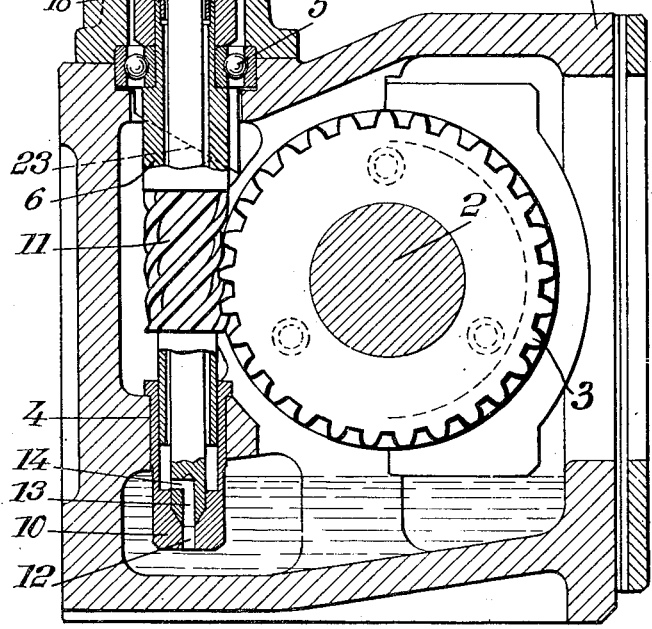
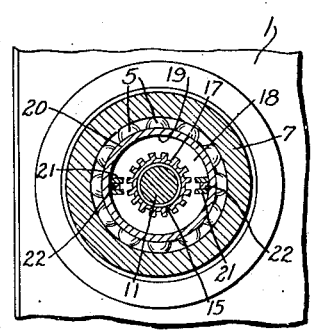

2,692,473

UNITED STATES PATENT OFFICE 2,692,473

SPINNING SPINDLE MECHANISM OF THE WORM AND WORM WHEEL DRIVE TYPE

Louis Birkigt, Versoix-Geneva, Switzerland, assignor to Society "Hispano-Suiza" (Suisse) S. A., Geneva, Switzerland, a society of Switzerland Application March 27, 1951, Serial No. 217,823

Claims priority, application Luxemburg April 18, 1950

10 Claims. (Cl. 57—102)

The present invention relates to spinning spindle mechanisms of the worm and worm wheel drive type.

Its chief object is to provide a mechanism of this type which is better adapted than those made up to this time to meet the requirements of practice.

For this purpose, I make use of a mechanism in which the teeth of the worm are carried by a sleeve journalled directly in the casing of the mechanism and through which passes with a material play the lower part of the cop carrying spindle, said spindle resting, at the bottom thereof, in a thrust bearing and being held, above the upper end of said sleeve, in an upper bearing supported by said casing, said spindle being driven in rotation by said sleeve through coupling means which make relative radial displacements possible between these two parts, and, according to my invention, the lower end of the spindle is arranged to constitute a centrifugal pump which draws lubricant from a reserve located at the bottom of said casing and the level of which is below the lowest part of the worm wheel and discharges it upwardly through the annular space provided between said sleeve and said spindle up to the level of the upper bearing which is thus lubricated, continuity of the lubricating circuit between the top of said sleeve and said upper bearing being preferably achieved through the coupling means provided between said sleeve and said spindle.

A preferred embodiment of my invention will be hereinafter described with reference to the accompanying drawings, given merely by way of example and in which:

Fig. 1 is an axial vertical sectional view of a spinning spindle mechanism made according to my invention.

Fig. 2 is a similar view showing on an enlarged scale a portion of this mechanism.

Fig. 3 is a horizontal section taken on the line 3—3 of Fig. 2.

Inside a hollow body or casing 1, adapted to be mounted on a suitable support, is horizontally journalled a transverse shaft 2 carrying a worm wheel 3 fixed thereon.

Casing 1 includes a lower bearing 4, for instance of the plain type, and an upper bearing 5, for instance a ball bearing, to support a sleeve 6 which carries, integral therewith, the teeth of the worm which cooperates with worm wheel 3.

Thus, both this worm wheel and this worm are journalled in casing 1, whereby correct meshing is obtained.

Coaxially with bearings 4 and 5, I provide, above casing 1, a tubular part 7 which carries, at the top thereof, a bearing 8, for instance a plain bearing, held in tubular part 7 with the interposition of an elastic ring 9, for instance of rubber.

The lower end of the cop carrying spindle is supported by a thrust bearing 10, coaxial with bearings 4, 5 and 8, and, for instance, rigid with bearing 4.

The cop carrying spindle is constituted by a metallic rod including, from bottom to top, the following portions:

First a portion capable of resting and fitting in thrust bearing 10;

Then a cylindrical portion 11 extending with a material play inside sleeve 6;

At a level slightly above the top of said sleeve 6, coupling means for causing the sleeve and the spindle to rotate together, these means being adapted to make relative radial movements possible between these parts, as will be more fully described hereinafter;

A cylindrical portion 25 journalled in bearing 8;

And the top portion 26 of the spindle, suitably shaped to support the desired type of cop.

According to my invention, the lower end of the spindle is arranged to constitute a centrifugal pump to draw in lubricant from a reserve or bath thereof provided at the bottom of casing 1 and having its surface below worm wheel 3, this pump discharging said lubricant upwardly through the annular space between the sleeve and the spindle up to the level of the upper bearing 8, which is thus lubricated.

In the embodiment shown by the drawing, this pump device is made as follows:

The bottom of thrust bearing 10 is provided with a conduit 12 opening into the mass of lubricant present in casing 1. The lower end of the spindle is provided with an axial conduit 13, in line with conduit 12, and with at least one radial conduit 14 extending from said axial conduit 13 to the outer wall of the spindle, whereby, during rotation of the spindle, lubricant is driven by the centrifugal force into the annular space between the spindle and sleeve 6.

In order to convey the stream of lubricant thus forced upwardly by this pump arrangement to the upper bearing 8, the passage through which said lubricant travels must be continuous and without any sudden increase of the cross section thereof between sleeve 6 and bearing 8.

For this purpose, advantageously, when, as shown on the drawing, there is a substantial interval between the top of said sleeve and the lower edge of said bearing, I make use of the coupling means provided between sleeve 6 and spindle 11 to constitute a portion of the lubricating circuit which leads from the bottom of said spindle to said upper bearing 8.

According to a preferred embodiment, said coupling means include an intermediate tubular element 15 connected on the one hand with the spindle through ribs 16 carried by the inner wall of said tubular element 15 at one end thereof, for instance the top end, and on the other hand with sleeve 6 (or a part rotating together therewith) through ribs 17 carried by the outer wall of said tubular element 15 at the other end thereof.

With such an arrangement, even if there is but a small play between cooperating ribs, slight displacements of spindle 11 bringing it into oblique position are possible, if necessary, owing to the possibility of relative radial displacement between the spindle and sleeve 6.

For this purpose, the upper ribs 16 are advantageously located at a substantial distance from the lower ribs 17, for instance a distance greater than the diameter of the spindle at this level.

It will be understood that, if care is taken to have tubular element 15 long enough to extend from the upper end of sleeve 6 to the lower edge of bearing 8, said tubular element advantageously having its lower edge engaged in said sleeve, as shown, lubricant will be forced from the annular space between spindle 11 and sleeve 6 into the annular space between spindle 11 and tubular element 15 and thence through the intervals between the cooperating ribs and grooves 16 of element 15 and spindle 11 to the bottom edge of bearing 8, through a lubricating circuit free from any gap.

According to the preferred embodiment shown by the drawing, the upper ribs 16 of element 15 cooperate with corresponding grooves 27 provided directly in the wall of spindle 11, immediately below bearing 8, whereas the lower ribs 17 of said element 15 cooperate with grooves provided in the inner wall of a ring 18 coupled with sleeve 6 by a centrifugal clutch device made as follows.

This ring 18 is housed at the bottom of a recess 19 provided in an upward extension 20 of sleeve 6. This ring 18 is provided with teeth 21 which couple it in rotation with centrifugal members 22 the side walls of which are intended to cooperate with the inner wall of recess 19. The placement of centrifugal members 22 between the teeth 21 of ring 18 is best seen in Fig. 3. Thus, as soon as sleeve 6 and its extension 20 start rotating, ring 18 is gradually driven in rotation due to friction between its under face and the bottom wall of part 20. Masses 22 are then caused by the centrifugal force to move outwardly until they are strongly urged against the inner wall of part 20 and then transmit without slipping the rotary movement of sleeve 6 and its extension 20 to ring 18.

It should be well understood that, as above stated, there must be provided, between tubular element 15 and the corresponding portion of spindle 11 and also between the cooperating ribbed portions of said parts 15 and 11 existing at 16, a passage sufficient for enabling the lubricant forced upwardly by pump structure 12—13—14 to reach bearing 8.

This lubricant flows back into recess 19, where it lubricates the centrifugal driving means, and along the outer wall of part 20 to bearing 5 and then back to the bottom of casing 1. On its downward travel it is advantageously guided through a spout 23 toward the teeth of worm wheel 3.

If necessary, a hole may also be provided in the wall of sleeve 6 so that lubricant is projected directly through this hole onto the periphery of said worm wheel.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A spinning spindle mechanism which comprises, in combination, a casing containing a reserve of lubricant at the bottom thereof, a shaft journalled horizontally in said casing, a worm wheel keyed on said shaft in said casing and located above said reserve of lubricant, a vertical tubular worm journalled in said casing and in mesh with said worm wheel, a vertical spindle substantially coaxial with said worm and extending therethrough with a substantial play, an upper and a lower bearing for said spindle carried by said casing, said upper bearing being located above the top of said worm, coupling means for transmitting rotation from said worm to said spindle, the lower portion of said spindle extending down to a level below that of the surface of said reserve of lubricant and being provided with conduits forming a centrifugal pump adapted to force lubricant upwardly from said reserve into the annular space between said spindle and said worm, and means including a portion of said coupling means forming a continuous lubricating passage between the top of said annular space and said upper bearing.

2. A spinning spindle mechanism which comprises, in combination, a casing containing a reserve of lubricant at the bottom thereof, a shaft journalled horizontally in said casing, a worm wheel keyed on said shaft in said casing and located above said reserve of lubricant, a vertical tubular worm journalled in said casing and in mesh with said worm wheel, a vertical spindle substantially coaxial with said worm and extending therethrough with a substantial play, an upper and a lower bearing for said spindle carried by said casing, said upper bearing being located above the top of said worm, a tubular element coaxially surrounding said spindle, corresponding cylindrical zones of one end of the inner wall of said tubular element and the outer wall of said spindle being provided with cooperating ribs and grooves for rotary coupling of said spindle and said element with some radial play, an annular part coaxial with said worm, means for coupling said annular part with said worm at least when said worm is rotating at a speed above a given value, corresponding cylindrical zones of the inner wall of said annular part and the other end of the outer wall of said tubular element being provided with cooperating ribs and grooves for rotary coupling between them with some radial play, the lower portion of said spindle extending down to a level below that of the surface of said reserve of lubricant and being provided with conduits forming a centrifugal pump adapted to force lubricant upwardly from said reserve into the annular space between said spindle and said worm, and means including said tubular element and said first mentioned ribs and grooves forming a continuous lubricating passage between the top of said annular space and said upper bearing.

3. A spinning spindle mechanism which comprises, in combination, a casing containing a reserve of lubricant at the bottom thereof, a shaft journalled horizontally in said casing, a worm wheel keyed on said shaft in said casing and located above said reserve of lubricant, a vertical tubular worm journalled in said casing and in mesh with said worm wheel, a vertical spindle substantially coaxial with said worm and extending therethrough with a substantial play, an upper and a lower bearing for said spindle carried by said casing, said upper bearing being located above the top of said worm, a tubular element coaxially surrounding said spindle, inward ribs carried by one end of said tubular element, said spindle being provided with grooves adapted to cooperate with some play with said ribs, outward ribs carried by the other end of said tubular element, an annular part coaxial with said worm provided with grooves adapted to cooperate with said last mentioned ribs, means for coupling said annular part with said worm at least when said worm is rotating at a speed above a given value, the lower portion of said spindle extending down to a level below that of the surface of said reserve of lubricant and being provided with conduits forming a centrifugal pump adapted to force lubricant upwardly from said reserve into the annular space between said spindle and said worm, and means including said tubular element and said first mentioned ribs and grooves forming a continuous lubricating passage between the top of said annular space and said upper bearing.

4. A mechanism according to claim 2 in which the ribbed zones of said tubular element are at a distance from each other higher than the diameter of said spindle at this level.

5. A mechanism according to claim 2 in which the means for coupling said annular part with said worm consist in a centrifugal clutch device.

6. A mechanism according to claim 2 in which the lower end of said tubular element engages into the top part of said worm.

7. A spinning spindle mechanism which comprises, in combination, a casing, a shaft journalled horizontally in said casing, a worm wheel keyed on said shaft in said casing, a vertical tubular worm journalled in said casing and in mesh with said worm wheel, a vertical spindle substantially coaxial with said worm and extending therethrough with a substantial play, an upper and a lower bearing for said spindle carried by said casing, said upper bearing being located above the top of said worm, a tubular element coaxially surrounding said spindle, corresponding cylindrical zones of one end of the inner wall of said tubular element and the outer wall of said spindle being provided with cooperating ribs and grooves for rotary coupling of said spindle and said element with some radial play, an annular part coaxial with said worm, corresponding cylindrical zones of the inner wall of said part and the other end of the outer wall of said tubular element being provided with cooperating ribs and grooves for rotary coupling between them with some radial play, and means for coupling said annular part with said worm at least when said worm is rotating at a speed above a given value.

8. A spinning spindle mechanism which comprises, in combination, a casing containing a reserve of lubricant at the bottom thereof, a shaft journalled horizontally in said casing, a worm wheel keyed on said shaft in said casing and located above said reserve of lubricant, a vertical tubular worm journalled in said casing and in mesh with said worm, a vertical spindle substantially coaxial with said worm and extending therethrough with a substantial play, a lower bearing for said spindle carried by said casing, an upper bearing for said spindle resiliently supported by said casing and located above the top of said worm, a tubular element coaxially surrounding said spindle, interfacing cylindrical zones of one end of said tubular element and of said spindle being provided with cooperating ribs and grooves for rotary coupling of said spindle and said element with some radial play, and an annular part rotatable together with said worm, interfacing cylindrical zones of said part and of said tubular element being provided with cooperating ribs and grooves for rotary coupling between them with some radial play.

9. A spinning spindle mechanism which comprises, in combination, a casing containing a reserve of lubricant at the bottom thereof, a shaft journalled horizontally in said casing, a worm wheel keyed on said shaft in said casing and located above said reserve of lubricant, a vertical tubular worm journalled in said casing and in mesh with said worm, a vertical spindle substantially coaxial with said worm and extending therethrough with a substantial play, a lower bearing for said spindle carried by said casing, an upper bearing for said spindle resiliently supported by said casing and located above the top of said worm, a tubular element coaxially surrounding said spindle, interfacing cylindrical zones of one end of the inner wall of said tubular element and of the outer wall of said spindle being provided with cooperating ribs and grooves for rotary coupling of said spindle and said element with some radial play, and an annular part rotatable together with said worm, interfacing cylindrical zones of the inner wall of said part and of the other end of the outer wall of said tubular element being provided with cooperating ribs and grooves for rotary coupling between them with some radial play.

10. A spinning spindle mechanism according to claim 8, in which the two cooperating ribs and grooves systems are located at a distance from each other at least equal to the diameter of the spindles at their level.

References Cited in the file of this patent

UNITED STATES PATENTS

| Number | Name | Date |
| --- | --- | --- |
| 2,587,812 | Birkigt | Mar. 4, 1952 |
| 2,594,724 | Birkigt | Apr. 29, 1952 |